United States Patent
Zurek

(10) Patent No.: US 7,610,272 B2
(45) Date of Patent: Oct. 27, 2009

(54) MATERIALIZED SAMPLES FOR A BUSINESS WAREHOUSE QUERY

(75) Inventor: Thomas Zurek, Walldorf (DE)

(73) Assignee: SAP AG, Walldorf (DE)

( * ) Notice: Subject to any disclaimer, the term of this patent is extended or adjusted under 35 U.S.C. 154(b) by 234 days.

(21) Appl. No.: 10/999,744

(22) Filed: Nov. 29, 2004

(65) Prior Publication Data

US 2006/0116984 A1 Jun. 1, 2006

(51) Int. Cl.
G06F 17/30 (2006.01)
(52) U.S. Cl. .............................. 707/3; 707/1
(58) Field of Classification Search ............. 707/3, 707/1
See application file for complete search history.

(56) References Cited

U.S. PATENT DOCUMENTS

| | | | | |
|---|---|---|---|---|
| 5,537,589 A | * | 7/1996 | Dalal | 707/101 |
| 5,781,896 A | * | 7/1998 | Dalal | 707/2 |
| 5,850,522 A | * | 12/1998 | Wlaschin | 709/215 |
| 5,878,426 A | * | 3/1999 | Plasek et al. | 707/102 |
| 5,890,150 A | * | 3/1999 | Ushijima et al. | 707/3 |
| 5,950,189 A | * | 9/1999 | Cohen et al. | 707/3 |
| 6,029,163 A | * | 2/2000 | Ziauddin | 707/2 |
| 6,064,999 A | * | 5/2000 | Dalal | 707/2 |
| 6,112,197 A | * | 8/2000 | Chatterjee et al. | 707/3 |
| 6,163,775 A | * | 12/2000 | Wlaschin et al. | 707/3 |
| 6,182,121 B1 | * | 1/2001 | Wlaschin | 709/215 |
| 6,263,334 B1 | * | 7/2001 | Fayyad et al. | 707/5 |
| 6,289,334 B1 | * | 9/2001 | Reiner et al. | 707/3 |
| 6,411,951 B1 | * | 6/2002 | Galindo-Legaria et al. | 707/3 |
| 6,513,029 B1 | * | 1/2003 | Agrawal et al. | 707/2 |
| 6,633,882 B1 | * | 10/2003 | Fayyad et al. | 707/101 |
| 6,721,727 B2 | * | 4/2004 | Chau et al. | 707/3 |
| 6,732,085 B1 | * | 5/2004 | Mozes | 707/2 |
| 6,993,516 B2 | * | 1/2006 | Haas et al. | 707/2 |
| 7,328,221 B2 | * | 2/2008 | Chaudhuri et al. | 707/102 |
| 2002/0123993 A1 | * | 9/2002 | Chau et al. | 707/5 |
| 2002/0178151 A1 | * | 11/2002 | Chaudhuri et al. | 707/3 |
| 2004/0002956 A1 | * | 1/2004 | Chaudhuri et al. | 707/2 |
| 2004/0193629 A1 | * | 9/2004 | Mozes | 707/100 |
| 2004/0225639 A1 | * | 11/2004 | Jakobsson et al. | 707/2 |
| 2005/0033739 A1 | * | 2/2005 | Chaudhuri et al. | 707/3 |

(Continued)

OTHER PUBLICATIONS

Olken, Frank, et al., "Maintenance of Materialized Views of Sampling Queries", Proceedings of the 8th International Conference Data Engineering, 1992, Tempe, AZ, Feb. 2-3, 1992, pp. 632-641.*

(Continued)

*Primary Examiner*—Robert Stevens
(74) *Attorney, Agent, or Firm*—Mintz, Levin, Cohn, Ferris, Glovsky & Popeo, P.C.

(57) ABSTRACT

A system and method for improving a query on a relational database in a business intelligence system is provided. A multidimensional data table is provided in the database. A sampling dimension is appended to the data table. The sampling dimension includes a number of cells, and wherein each cell includes a sampling value corresponding to the data of at least one of the dimensions of the data table. The data table is then clustered in at least one of the dimensions based on the associated sampling value in the sampling dimension. A query for a subset of data can then be executed on the clustered data table based on the sampling values.

20 Claims, 4 Drawing Sheets

U.S. PATENT DOCUMENTS

2005/0033759 A1* 2/2005 Chaudhuri et al. .......... 707/100

OTHER PUBLICATIONS

Agrawal, Sanjay, et al., "Integrating Vertical and Horizontal Partitioning Into Automated Physical Database Design", SIGMOD 2004, Paris, France, Jun. 13-14, 2004, pp. 359-370.*

Babcock, Brian, et al., "Dynamic Sample Selection For Approximate Query Processing", SIGMOD 2003, San Diego, CA, Jun. 9-12, 2003, pp. 539-550.*

Chaudhuri, Surajit, et al., "A Robust, Optimization-Based Approach for Approximate Answering of Aggregate Queries", ACM SIGMOD 2001, Santa Barbara, CA, May 21-24, 2001, pp. 295-306.*

Oren, David, et al., "Online Subpath Profiling", Lecture Note in Computer Science, vol. 2304, © 2002, pp. 78-94.*

Plemmons, Howard, et al., "Scaling SAS Data Access to Oracle RDBMS", SUGI 28 Paper 151-28, Seattle, WA, Mar. 30-Apr. 2, 2003, pp. 1-6.*

Bruno, Nicolas, et al., "Efficient Creation of Statistics Over Query Expressions", ICDE '03, Bangalore, India, Mar. 5-8, 2003, pp. 201-212.*

Lee, Chiang, et al., "Query Optimization in Multidatabase Systems Considering Schema Conflicts", IEEE Transactions on Knowledge and Data Engineering, vol. 9, Issue 6, Nov./Dec. 1997, pp. 941-955.*

Ushijima, Kazutomo, et al., "SUPRA: A Sampling-Query Optimization Method for Large-Scale OLAP", Proceedings of the Ninth International Workshop on Database and Expert Systems Applications, Vienna, Austria, Aug. 26-28, 1998, pp. 232-237.*

Markl, Volker, et al., "LEO: An Autonomic Query Optimizer for DB2", IBM Systems Journal, vol. 42, No. 1, © 2003, pp. 98-106.*

Stillger, Michael, et al., "LEO—DB2's LEarning Optimizer", Proc. of the 27th VLDB Conf., Roma, Italy, © 2001, pp. 1-10.*

* cited by examiner

FIG. 1A (PRIOR ART)

| Year | Month | Day | City | Region | Country | Sales Pers. | Division | Distr. Ch. | Sales Org. | Product | Product Grp. | Quantity in PC | Profit in $ |
|---|---|---|---|---|---|---|---|---|---|---|---|---|---|
| 1998 | 011998 | 19980101 | BERLIN | DE-NORTH | DE | JIM | SOFTWARE | INTERNET | AMERICAS | PAINT | OFFICE | 730 | 6763 |
| 1998 | 011998 | 19980101 | BERLIN | DE-NORTH | DE | MARISA | SOFTWARE | INTERNET | AMERICAS | PAINT | OFFICE | 390 | 2614 |
| 1998 | 011998 | 19980102 | BERLIN | DE-NORTH | DE | JACK | SOFTWARE | AGENT | EUROPE | PAINT | OFFICE | 780 | 3866 |
| 1998 | 011998 | 19980103 | BERLIN | DE-NORTH | DE | MANDY | SOFTWARE | RETAIL | EUROPE | WIN-OS | OS | 970 | -3734 |
| 1998 | 011998 | 19980120 | MILAN | IT-NORTH | IT | MONICA | SOFTWARE | AGENT | EUROPE | WIN-OS | OS | 190 | 1355 |
| 1998 | 011998 | 19980121 | MILAN | IT-NORTH | IT | MONICA | SOFTWARE | INTERNET | EUROPE | WIN-OS | OS | 810 | 7565 |
| 1998 | 011998 | 19980122 | MILAN | IT-NORTH | IT | BILL | HARDWARE | AGENT | AMERICAS | PC-3 | PC | 250 | -861 |
| 1998 | 011998 | 19980123 | MILAN | IT-NORTH | IT | JOE | HARDWARE | RETAIL | AMERICAS | PC-3 | PC | 40 | -44 |
| 1998 | 011998 | 19980124 | MILAN | IT-NORTH | IT | JIM | HARDWARE | AGENT | AMERICAS | PC-3 | PC | 160 | -503 |
| 1998 | 011998 | 19980124 | FRANKFURT | DE-SOUTH | DE | KIM | HARDWARE | INTERNET | EUROPE | PC-3 | PC | 50 | 18 |
| 1998 | 011998 | 19980125 | FRANKFURT | DE-SOUTH | DE | BILL | HARDWARE | INTERNET | AMERICAS | PC-3 | PC | 990 | 6468 |

FIG. 1B (PRIOR ART)

| Year | Month | Day | City | Region | Country | Sales Pers. | Division | Distr. Ch. | Sales Org. | Product | Product Grp. | Quantity in PC | Profit in $ |
|---|---|---|---|---|---|---|---|---|---|---|---|---|---|
| 1998 | 011998 | 19980120 | MILAN | IT-NORTH | IT | MONICA | SOFTWARE | AGENT | EUROPE | WIN-OS | OS | 190 | 1355 |
| 1998 | 011998 | 19980121 | MILAN | IT-NORTH | IT | MONICA | SOFTWARE | INTERNET | EUROPE | WIN-OS | OS | 810 | 7565 |
| 1998 | 011998 | 19980122 | MILAN | IT-NORTH | IT | BILL | HARDWARE | AGENT | AMERICAS | PC-3 | PC | 250 | -861 |
| 1998 | 011998 | 19980123 | MILAN | IT-NORTH | IT | JOE | HARDWARE | RETAIL | AMERICAS | PC-3 | PC | 40 | -44 |
| 1998 | 011998 | 19980124 | MILAN | IT-NORTH | IT | JIM | HARDWARE | AGENT | AMERICAS | PC-3 | PC | 160 | -503 |

FIG. 1C (PRIOR ART)

| Division | Quan |
|---|---|
| SOFTWARE | 1000 |
| HARDWARE | 450 |

| Sample | Year | Month | Day | City | Region | Country | Sales Pers. | Division | ... |
|---|---|---|---|---|---|---|---|---|---|
| 0 | 1998 | 011998 | 19980101 | BERLIN | DE-NORTH | DE | JIM | SOFTWARE | ... |
| 1 | 1998 | 011998 | 19980101 | BERLIN | DE-NORTH | DE | MARISA | SOFTWARE | ... |
| 0 | 1998 | 011998 | 19980102 | BERLIN | DE-NORTH | DE | JACK | SOFTWARE | ... |
| 0 | 1998 | 011998 | 19980103 | BERLIN | DE-NORTH | DE | MANDY | SOFTWARE | ... |
| 0 | 1998 | 011998 | 19980120 | MILAN | IT-NORTH | IT | MONICA | SOFTWARE | ... |
| 0 | 1998 | 011998 | 19980121 | MILAN | IT-NORTH | IT | MONICA | SOFTWARE | ... |
| 1 | 1998 | 011998 | 19980122 | MILAN | IT-NORTH | IT | BILL | HARDWARE | ... |
| 0 | 1998 | 011998 | 19980123 | MILAN | IT-NORTH | IT | JOE | HARDWARE | ... |
| 0 | 1998 | 011998 | 19980124 | MILAN | IT-NORTH | IT | JIM | HARDWARE | ... |
| 0 | 1998 | 011998 | 19980124 | FRANKFURT | DE-SOUTH | DE | KIM | HARDWARE | ... |
| 1 | 1998 | 011998 | 19980125 | FRANKFURT | DE-SOUTH | DE | BILL | HARDWARE | ... |
| ... | ... | ... | ... | ... | ... | ... | ... | ... | ... |

FIG. 2 (PRIOR ART)

MATERIALIZED SAMPLES FOR A BUSINESS WAREHOUSE QUERY

BACKGROUND

Relational database management system (RDBMS) use queries to aggregate huge amounts of data in order to present a relatively small result. One use of an RDBMS can be found in a business warehouse (BW) data storage and processing system on which business intelligence (BI) queries are received and processed. In RDBMS queries employing system query language (SQL), for example, two parameters can be identified that generally characterize such queries:

QDBSEL: represents the number of rows that contribute to the result; initially, these are all rows from tables listed in the FROM clause, but then restricted by the WHERE clause of the SQL query.

QBTRANS: represents the number of rows in the query result. QDBTRANS≦QDBSEL holds in general, but typically QDBTRANS is far less than QDBSEL because the rows identified through the FROM and WHERE clauses are usually aggregated by a GROUP BY function.

Consider the data in table T in FIG. 1A and the following query Q1 to be run on this table:

SELECT Division, SUM(Quantity) AS "Quan"

FROM T

WHERE Country='IT'

GROUP BY Division                                    (Q1)

FIG. 1B shows the rows that contribute to the result. In this case, QDBSEL=5. FIG. 1C shows the result of the query Q1, thus QDBTRANS=2. Frequently, query processing performance is poor due to the fact that huge amounts of data are involved, i.e. that QDBSEL is huge. Another problem is a potentially huge aggregation effort, i.e. a situation where QDBSEL is very large compared to QDBTRANS.

For some queries, it may be sufficient to get a rough estimate rather than a precise result, particularly if trends and estimates are the focus of the query instead of exact values. To that end, rather than operating on the full set of data, such queries can run on a sample of the data which is typically much smaller. FIG. 2 illustrates a logical view of such a sampling approach, in which an additional column SAMPLE holds "1" if the respective row forms part of the sample, and holds "0" otherwise. Query Q1 can be transformed into a "sample-query" Q2 as follows:

SELECT Division, SUM(Quantity)*100 AS "Quan"

FROM T

WHERE Country='IT' AND Sample=1

GROUP BY Division                                    (Q2)

This transformation assumes that the sample involves 1% of the rows of T. Thus this query would return values in the result column "Quan" that are an approximation of the actual values which might be sufficient for the purpose of the query. The difference is that QDBSEL(Q2)≈QDBSEL(Q1)/100, while QDBTRANS(Q2)≈QDBTRANS(Q1). One challenge is to translate the lower value for QDBSEL(Q2) into improved performance for the user.

Such performance improvements are not always realized for a number of reasons. Typically, the physical storage of commercial a RDBMS is managed based on blocks or pages. Accordingly, in a worst case each block of T holds a row that is part of the sample (i.e. with Sample=1). This means that all blocks (i.e. all rows) of T are read from the disk which provides a query run time for Q2 that is approximately the same as for Q1. At the other extreme is a situation in which the sample is spread over a few blocks. In this case, a significantly better run time can be expected.

Recently, however, many commercial RDBMSs have introduced a functionality to allow row-level or block-level sampling at query run time. As such, the following queries Q3 and Q4 can be expressed as follows to be substantially equivalent to Q2 above:

SELECT Division, SUM(Quantity)*100 AS "Quan"

FROM T TABLESAMPLE BERNOULLI (1.0)

WHERE Country='IT'

GROUP BY Division                                    (Q3)

SELECT Division, SUM(Quantity)*100 AS "Quan"

FROM T TABLESAMPLE SYSTEM (1.0)

WHERE Country='IT'

GROUP BY Division                                    (Q4)

While Q3 calculates a result based on a row-level sample, Q4 provides a result based on a block-level sample. Typically, the result of Q3 gives a better approximation than the result of Q4; however, Q3 is likely to run longer than Q4 because of more input/output (I/O) operations to and from the disk.

SUMMARY

This document discloses systems and methods for optimizing queries on a relational database, particularly in a business intelligence system. In one embodiment, a system includes table T stored in the database. The table T can have X number of columns and Y number of rows, or any number of dimensions. The system further includes a sample generator configured to generate a sampling column having Y cells. Each cell includes a sampling value for each of the Y rows in the table T. The sample generator is further configured to append the sampling column to the table T in the database.

In accordance with another embodiment, a method includes providing a table T in the database, the table T having X number of columns and Y number of rows. The method further includes generating a sampling column having Y cells, wherein each cell includes a sampling value for each of the Y rows in the table T. The method further includes appending the sampling column to the table T in the database.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1A is an example table T in a relational database.

FIG. 1B shows rows and columns of table T that are used in a query.

FIG. 1C shows the result of a query on table T.

FIG. 2 shows an example of row sampling.

Like reference symbols in the various drawings indicate like elements.

DETAILED DESCRIPTION

A system and method are disclosed for improved queries of a relational databases. The system and method combine the advantages, among others, of row-level and block-level sampling to achieve faster query results and other improved performance.

Figure 3:
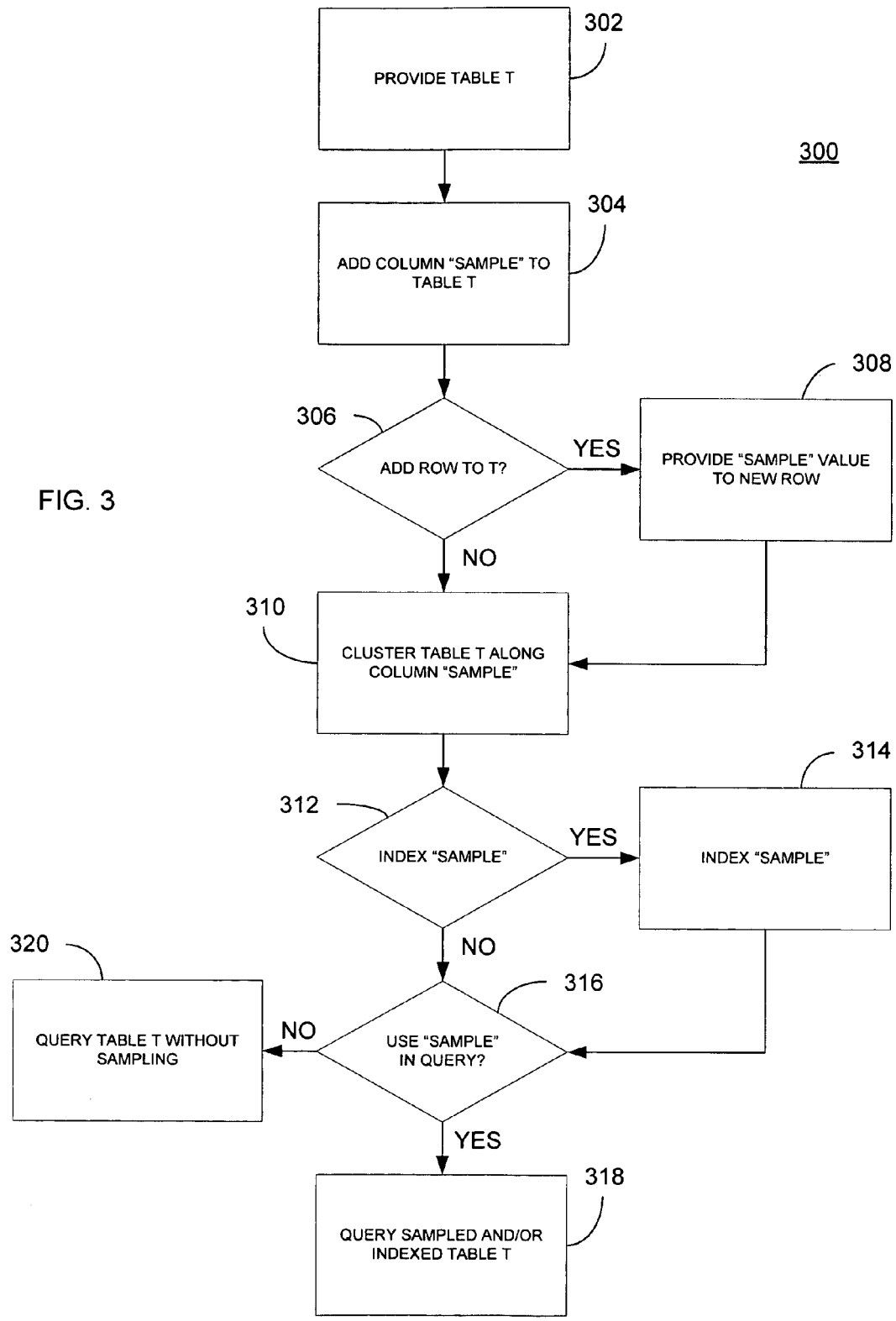
FIG. 3 is a flowchart of a method for generating a materialized sampling of a table T for improved queries.

FIG. 3 is a flowchart of a method 300 for generating a materialized sample for a table T for improved query performance. At 302, a table T stored in a database is provided. The table T can be the fact table within a star or snowflake schema, such as in the context of an SAP Business Warehouse (BW) structure, or a flat table of rows and columns, much like the type of table used for holding the active versions of an ODS object.

At 304, a column Sample is physically added to the table T. This column can hold various values, such as "0" (i.e. the associated row is not part of the sample) or "1" (i.e. the associated row is part of the sample). Any data type and/or range of values may be used. For instance, in one exemplary embodiment, more than two values can be used in order to create a set of samples, e.g. "0"=not part of any sample, "1"=part of a first sample, "2"=part of second sample. Alternatively, a bitwise encoding scheme can be used to allow a row to form a part of more than one sample.

At 306, a decision may be made whether to add new rows to table T. If rows are added to T at 308, the rows will hold a value in column Sample that has been set either by the user or by the system. For example, the system may automatically set a value of an added row through a trigger or through some application code such as update rules in a BW system.

At 310, table T is clustered along column Sample according to a process in which rows with the same value in column Sample are physically stored in close proximity on a storage medium. This can be achieved by several mechanisms in commercial RDBMSs. For example, in one type of RDBMS, the table T can be partitioned along column Sample, such as by using a range, list, or composite partitioning. Another type of RDBMS offers a multidimensional clustering (MDC) tool. At 312, a decision may be made whether to add an index for column Sample, or incorporate the column Sample into an existing index or indices. In an alternative embodiment, at 314, an index for the column Sample can be added, or the column Sample can be incorporated into one or more existing indices.

At 316, a decision is made whether to use a sample (or in the presence of a variety of samples, which sample) for the query. The decision can be executed by asking the user whether the sample is to be used. In a system employing two or more samples, the user may also designate which sample to use. In an exemplary embodiment, e.g. within an SAP BW BEX query designer, a user interface is provided to request the input from the user. In the case in which a specific sample should be used, the underlying WHERE clause of the query is extended in the fashion shown in query Q2. In a non-SQL-based approach, like MDX (multi-dimensional expressions) or XML/A (XML (extensible markup language) for analysis), a corresponding filter condition is added for the column Sample, where the "column" is represented as a dimension or dimension level. If a sample is to be used, at 318 the query is executed using the column Sample, whether or not the column Sample is indexed. Otherwise, at 320 the query is executed without sampling.

Figure 4:
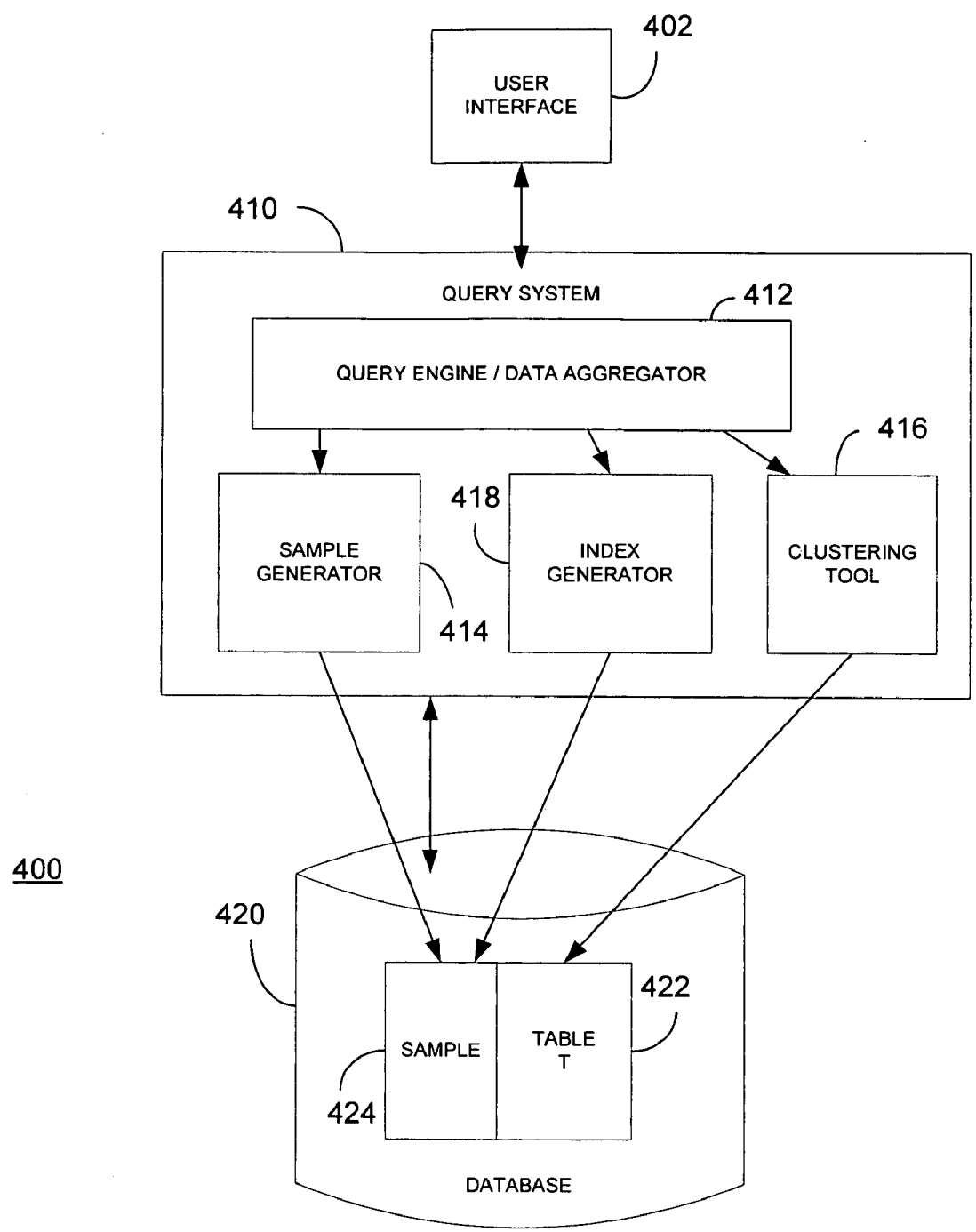
FIG. 4 is a system for executing materialized sampling of a database table.

FIG. 4 shows a system 400 for executing an improved query. The query as well as other instructions typically originates from a user interface 402 or client computer system coupled to the system 400 via a network. The system 400 includes a business warehouse (BW) query system 410 coupled with a database 420. The database 420 is preferably a relational database conforming to SQL or similar types of queries, but other databases can be used.

The query system 410 includes a query engine 412 configured to receive and process queries from the user interface 402, and aggregate and report results based on the query back to the user interface 402. The query engine 412 operates on data stored in the database 420, provided in a table T 422. Table T 422 can have any number of rows and columns, where the intersection of each row and each column represents a cell containing a data object.

In accordance with an embodiment, the query system 410 includes a sample generator 414 configured to generate a column Sample 424 as described above, and physically add the column Sample 424 to the table T 422 in the database. The query system 410 also includes a clustering tool 416 configured to cluster the rows in the table T 422 according to an ordered arrangement of values assigned to each cell in the column Sample 424, such that rows with the same value in column Sample 424 are stored together. Example clustering tools 416 can include a multidimensional clustering (MDC) or composite partitioning, although various other clustering tools can be used. The query system 410 further includes an index generator 418 for generating an index for the column Sample 424, or for incorporating the column Sample 424 into an existing index, if desired.

In operation, the query engine 412 executes a query according to block-level sampling of the clustered table T 422, arranged according to the column Sample 424. Accordingly, I/O communications to database for access to the data in table T 422 are minimized to a level commensurate with the sampling. The materialized sample in column Sample 424 also allows new rows to be added to table T 422 and automatically associated with the clustering schema in the column Sample 424.

Although a few embodiments have been described in detail above, other modifications are possible. The logic flow depicted in FIG. 3 need not necessarily be executed in the order shown to achieve desirable results. Other embodiments may be within the scope of the following claims.

The invention claimed is:

1. A computer-implemented method of improving a query of a relational database, the method comprising:

providing a table T stored in the relational database, the table T having X number of columns and Y number of rows;

generating a sampling column having Y cells, wherein each cell includes a sampling value for each of the Y rows in the table T, the sampling value, stored on a storage medium, representative of whether a query of the relational database will sample a corresponding one of the Y rows, the sample value of each of the Y rows comprising a first value when the row is not part of a sample, a second value when the row is part of a first sample, and a third value when the row is part of a second sample;

appending the sampling column to the table T stored in the relational database, the table including the appended sampling column to enable the query; and providing, when a row is added to the table T, one of the first value, the second value, or the third value, to the row in the sampling column.

2. The computer-implemented method in accordance with claim 1, further comprising clustering the rows of table T according to the sampling values in the sampling column.

3. The computer-implemented method in accordance with claim 2, further comprising grouping rows having the same values, the grouped rows having the same values stored in close proximity on a storage medium.

4. The computer-implemented method in accordance with claim 3, further comprising arranging the grouped rows according to the sampling values of the associated cells of the sampling column.

5. The computer-implemented method in accordance with claim 2, further comprising receiving a query for data from the table T.

6. The computer-implemented method in accordance with claim 5, further comprising executing the query on the clustered rows of the table T.

7. The computer-implemented method in accordance with claim 1, further comprising indexing the sampling column.

8. The computer-implemented method in accordance with claim 7, wherein indexing the sampling column includes adding an index for the sampling column to the database.

9. The computer-implemented method in accordance with claim 7, wherein indexing the sampling column includes incorporating the sampling column into an existing index in the database.

10. The computer-implemented method in accordance with claim 7, further comprising generating an index for the sampling column.

11. A system for optimizing a query on a relational database, the system comprising:
   a table T stored in the relational database on a storage medium, the table T having X number of columns and Y number of rows; and
   a sample generator configured to generate a sampling column having Y cells, wherein each cell includes a sampling value, stored in the storage medium, for each of the Y rows in the table T, the sampling value representative of whether a query of the relational database will sample a corresponding one of the Y rows, and further configured to append the sampling column to the table T stored in the relational database, the table including the appended sampling column to enable the query, the sample value of each of the Y rows comprising a first value when the row is not part of a sample, a second value when the row is part of a first sample, and a third value when the row is part of a second sample.

12. The system in accordance with claim 11, further comprising a clustering tool configured to cluster the rows of table T according to the sampling values in the sampling column.

13. The system in accordance with claim 11, further comprising an index generator for indexing the sampling column in the database.

14. The system in accordance with claim 13, wherein the index generator is configured to generate a new index for the sampling column.

15. The system in accordance with claim 13, wherein the index generator is configured to incorporate the sampling column in an existing index in the database.

16. A computer-implemented method of executing a query on a relational database, the method comprising:
   providing a multidimensional data table stored in the database;
   appending a sampling dimension to the data table, wherein the sampling dimension includes a number of cells, and wherein each cell includes a sampling value, stored in a storage medium corresponding to the data of at least one of the dimensions of the data table, the sample value of each of the cells comprises a first value when the row is not part of a sample, a second value when the cell is part of a first sample, and a third value when the cell is part of a second sample;
   clustering the data table in at least one of the dimensions based on the associated sampling value in the sampling dimension;
   receiving a query for a subset of data stored in the database; and
   executing the query on the clustered data table based on the sampling values corresponding to the subset of data stored in the database.

17. The computer-implemented method in accordance with claim 16, further comprising generating an index for the sampling dimension in the database.

18. The computer-implemented method in accordance with claim 16, wherein the data table includes X rows and Y columns, and wherein the sampling dimension includes a column of X cells.

19. The computer-implemented method in accordance with claim 16, wherein receiving a query further includes receiving instructions whether to execute the query based on the sampling values.

20. The computer-implemented method in accordance with claim 16, further comprising generating a result of the query based on the sampling values corresponding to the subset of data.

* * * * *